US011533891B1

United States Patent
Markič

(10) Patent No.: US 11,533,891 B1
(45) Date of Patent: Dec. 27, 2022

(54) AUTOMATED LIGHT-SENSITIVE CONFIGURABLE ANIMAL DOOR

(71) Applicant: Jure Markič, Kresnice (SI)

(72) Inventor: Jure Markič, Kresnice (SI)

(*) Notice: Subject to any disclaimer, the term of this patent is extended or adjusted under 35 U.S.C. 154(b) by 0 days.

(21) Appl. No.: 17/675,662

(22) Filed: Feb. 18, 2022

(51) Int. Cl.
| | |
|---|---|
| *G08B 13/08* | (2006.01) |
| *A01K 31/02* | (2006.01) |
| *E05F 15/78* | (2015.01) |
| *E05F 15/665* | (2015.01) |
| *A01K 31/10* | (2006.01) |
| *A01K 31/18* | (2006.01) |

(52) U.S. Cl.
CPC ............. *A01K 31/02* (2013.01); *A01K 31/10* (2013.01); *E05F 15/665* (2015.01); *E05F 15/78* (2015.01); *A01K 31/18* (2013.01); *E05Y 2400/32* (2013.01); *E05Y 2400/612* (2013.01); *E05Y 2400/822* (2013.01); *E05Y 2400/86* (2013.01); *E05Y 2900/132* (2013.01)

(58) Field of Classification Search
CPC .... A01K 31/00; A01K 31/002; A01K 31/005; A01K 31/02; A10K 31/10; E05F 15/665; E05F 15/668; E05F 15/67; E05F 15/695; E05F 2017/005; E05F 17/00; E05F 15/70; E05F 15/78; E05Y 2400/32; E05Y 2400/612; E05Y 2400/822; E05Y 2400/86; E05Y 2900/132
USPC ............................................................ 49/14
See application file for complete search history.

(56) References Cited

U.S. PATENT DOCUMENTS

| 3,690,299 A | 9/1972 | Johnson |
|---|---|---|
| 4,158,277 A | 6/1979 | Krempp et al. |
| (Continued) | | |

FOREIGN PATENT DOCUMENTS

| CN | 307089929 S | 1/2022 |
|---|---|---|
| CN | 307102636 S | 2/2022 |
| CN | 307466538 S | 7/2022 |

OTHER PUBLICATIONS

"Run-Chicken Door (Brown) Automatic Chicken Coop Door Opener with Timer, Programmable Light Sensor, Battery Powered, Evening and Morning Delay, Aluminum Door, Automatic Chicken Door Opener Model T50", retrieved from https://www.amazon.com/dp/B07XHG472H?linkCode=ogi&tag=w countryliving_auto-append-20&ascsubtag=%5Bartid% 7C10050.g .39373381 %5Bsrc% 7C%5Bch% &C%5BIt% 7C, retrived on Aug. 17, 2022, 13 pages.

(Continued)

*Primary Examiner* — Chi Q Nguyen
(74) *Attorney, Agent, or Firm* — Bochner IP, PLLC; Andrew D. Bochner

(57) ABSTRACT

An animal door unit comprising a front panel, a left rear panel, a left guide, a right rear panel, and a right guide, wherein the front panel comprises an entrance; and a door plate having a plurality of guide holes, the door plate configurable in a retracted state and an open state, wherein, in the retracted state, the door plate traverses the entrance, and wherein, in the open state, the door plate does not traverse the entrance. The animal door unit may include a motor disposed within a module case; and a sprocket in rotational communication with the motor, wherein the sprocket interfaces with the plurality of guide holes, such rotational movement of the sprocket inducing linear movement in the door plate.

15 Claims, 3 Drawing Sheets

(56) References Cited

U.S. PATENT DOCUMENTS

| | | | |
|---|---|---|---|
| 5,601,131 A * | 2/1997 | Morris | E05B 65/0021 160/207 |
| D382,649 S | 8/1997 | Davlantes | |
| D387,179 S | 12/1997 | Davlantes | |
| D400,265 S | 10/1998 | Davlantes | |
| D407,500 S | 3/1999 | Gribble | |
| D448,088 S | 9/2001 | McFee | |
| 6,422,965 B1 * | 7/2002 | Balli | E06B 9/74 160/310 |
| D507,660 S | 7/2005 | Reid et al. | |
| D538,942 S | 3/2007 | Grundy | |
| D656,687 S | 3/2012 | VanBuuren et al. | |
| D734,568 S | 7/2015 | Miller | |
| D789,620 S | 6/2017 | Hampel | |
| D849,269 S | 5/2019 | Yi | |
| D897,559 S | 9/2020 | Taylor | |
| 10,829,970 B2 * | 11/2020 | Ehrlich | E05D 13/1261 |
| D925,064 S | 7/2021 | Yi | |
| 11,319,744 B2 * | 5/2022 | Mussack | A01D 41/1208 |
| 2010/0050529 A1 * | 3/2010 | Manser | E06B 9/06 49/199 |
| 2014/0190081 A1 | 7/2014 | Wanjohi | |
| 2016/0186485 A1 | 6/2016 | Taylor | |
| 2016/0251852 A1 * | 9/2016 | Dickson | E05D 15/063 160/7 |
| 2016/0356070 A1 * | 12/2016 | Tseng | E05F 15/668 |
| 2017/0074019 A1 * | 3/2017 | Schweiss | E05C 1/06 |
| 2018/0230732 A1 * | 8/2018 | Tseng | E06B 9/0676 |
| 2019/0112860 A1 * | 4/2019 | Urban | E05F 15/73 |
| 2020/0010196 A1 * | 1/2020 | Trotter | E05F 15/63 |
| 2021/0131180 A1 * | 5/2021 | Jones | E05D 13/04 |
| 2021/0198934 A1 * | 7/2021 | Trotter | E05F 11/02 |

OTHER PUBLICATIONS

"Run-Chicken MOdel T50 Red Automatic Chicken Coop Door, Full Aluminum Doors, Light Sensing, Evening and Morning Delayed Opening Time", retrieved from https://www.amazon.com/RUN-CHICKEN-Automatic-Chicken-Aluminum-Sensing/dp/B08LP1MY JJ?ref_=ast_sto_dp, retrieved on Aug. 17, 2022, 12 pages.

"Run-Chicken T50—Buckeye Brown | Run Chicken", retrieved from https://run-chicken.com/product/run-chicken-t50-buckeye-brown/ DEC 2021, retrieved on Aug. 17, 2022, 6 pages (Year: 2021).

"Run-Chicken USA's Best Automatic Chicken Coop Door" retrieved from https://run-chicken.com/ retrieved on Aug. 17, 2022, 1 page.

"Top 10 Automatic Chicken Doors of 2020 | Video Review", retrieved from https://wiki.ezvid.com/best-automatic-chicken-doors, last updated on Aug. 5, 2020, retrieved on Aug. 17, 2022, 2 pages.

* cited by examiner

AUTOMATED LIGHT-SENSITIVE CONFIGURABLE ANIMAL DOOR

FIELD OF INVENTION

The present invention is in the field of animal entryways; specifically light sensing automated chicken coop doors.

INTRODUCTION

Farmers and layman alike have raised livestock, specifically chickens, for centuries. Typically, one's livestock is contained in various spaces, for example, barns, fenced pens, and chicken coops. Accordingly, to raise healthy chickens, the owner must provide a means for the animal to travel from the security of the coop to the open space of the chicken run.

The typical chicken coop door is not automated or motorized, and therefore requires the chicken owner's attention at least twice per day. Unfortunately, this may require the chicken owner to be available at these times each day indefinitely and may require the owner to traverse inclement weather conditions. Moreover, a chicken coop door may be enclosed by a fenced chicken run which, although may be sized to house chickens, is likely too small for a human to easily access. Failure to open or close the chicken door, thus preventing the chickens from entering the coop, may result in death or injury from predators or dangerous weather conditions. Similarly, chickens retained within the coop for extended periods of time may suffer from various health issues related to lack of exercise and insufficient sun exposure.

Accordingly, it is desirable to have an automated chicken door configured to operate on battery power. It would be further desirable to provide a chicken door with electrical components suitable to operate in extreme high and low temperatures and throughout steady rainfall.

Further, it is desirable to provide a chicken door that is robust and seals securely but is easy to install for the average user. It would yet be further desirable to provide a programmable chicken door unit.

SUMMARY

The invention of the present disclosure may be an animal door unit comprising a front panel, a left rear panel, a left guide, a right rear panel, and a right guide. The front panel may include an entrance, and the left guide may be disposed between the front panel and the left rear panel. The right guide may be disposed between the front panel and the right rear panel. The animal door unit may further comprise a door plate having a plurality of guide holes, the door plate configurable in a retracted state and an open state. The door plate may be disposed between the front panel, the left rear panel, the left guide, the right rear panel, and the right guide. In the retracted state, the door plate may traverse the entrance, and, in the open state, the door plate may not traverse the entrance.

In an embodiment, the animal door unit includes a module case disposed on the front panel, a motor disposed within the module case, and a sprocket in rotational communication with the motor. The sprocket may interface with the plurality of guide holes, where such rotational movement of the sprocket may induce linear movement in the door plate.

In an embodiment, the animal door unit comprises a light sensor configured to detect ambient light and a PCB in electrical communication with at least the light sensor and the motor, the PCB configured to instruct actuation of the motor. Further, the animal door unit may include an indicator light in electrical communication with the PCB. The indicator light may be configured to communicate a notification to a user. The PCB may include computer-executable instructions for one or more modes, wherein each of the one or more modes may be configured to control movement of the door plate. In an embodiment, the one or more modes comprises a default mode. In the default mode, the PCB may instruct the motor to drive the sprocket at a predetermined period of time after a sunrise time and a sunset time. The sunrise time and the sunset time may be determined via the light sensor. The one or more modes may further comprise a configurable mode, wherein the light sensor may be configured to retrieve an image via an external configurator, wherein the external configurator may be executed on a user device, and wherein the image may be encoded with a customized instruction executable by the PCB.

In a further embodiment, the animal door unit comprises a pushbutton in electrical communication with the PCB. The module case may comprise a sensor window and a pushbutton hole, wherein the sensor window may be disposed in front of the light sensor, and wherein the pushbutton hold may be sized to at least partially accept the pushbutton. In an embodiment, the front panel comprises a plurality of mounting holes. Moreover, the front panel and the entrance may include flat corners.

In an embodiment, the module case further comprises a lens disposed within the sensor window. The computer-executable instructions may further include a safety feature, wherein, if the door plate contacts an obstruction, the PCB discontinues the motor actuation.

Further, in the safety feature, if the door plate contacts the obstruction, the PCB may reinstate the motor actuation after an obstruction clearance period has lapsed. The one or more modes may also comprise an insufficient power mode, wherein the insufficient power mode may be actuated upon depletion of the battery, wherein, in the insufficient power mode, if the door plate is in the open state, the PCB may instruct the motor to drive the sprocket to retract the door plate, and wherein, in the insufficient power mode, the PCB may be configured to maintain the door plate in the retracted state until the battery has sufficient charge.

The module case may further comprise a plurality of top slots, a plurality of bottom slots, and a plurality of motor mounts, wherein the motor mounts are slats configured to retain at least the motor, and wherein the plurality of top slots and the plurality of bottom slots accept the plurality of motor mounts.

Additional aspects related to this disclosure are set forth, in part, in the description which follows, and, in part, will be obvious from the description, or may be learned by practice of this disclosure.

It is to be understood that both the forgoing and the following descriptions are exemplary and explanatory only and are not intended to limit the claimed disclosure or application thereof in any manner whatsoever.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

Figure 1:
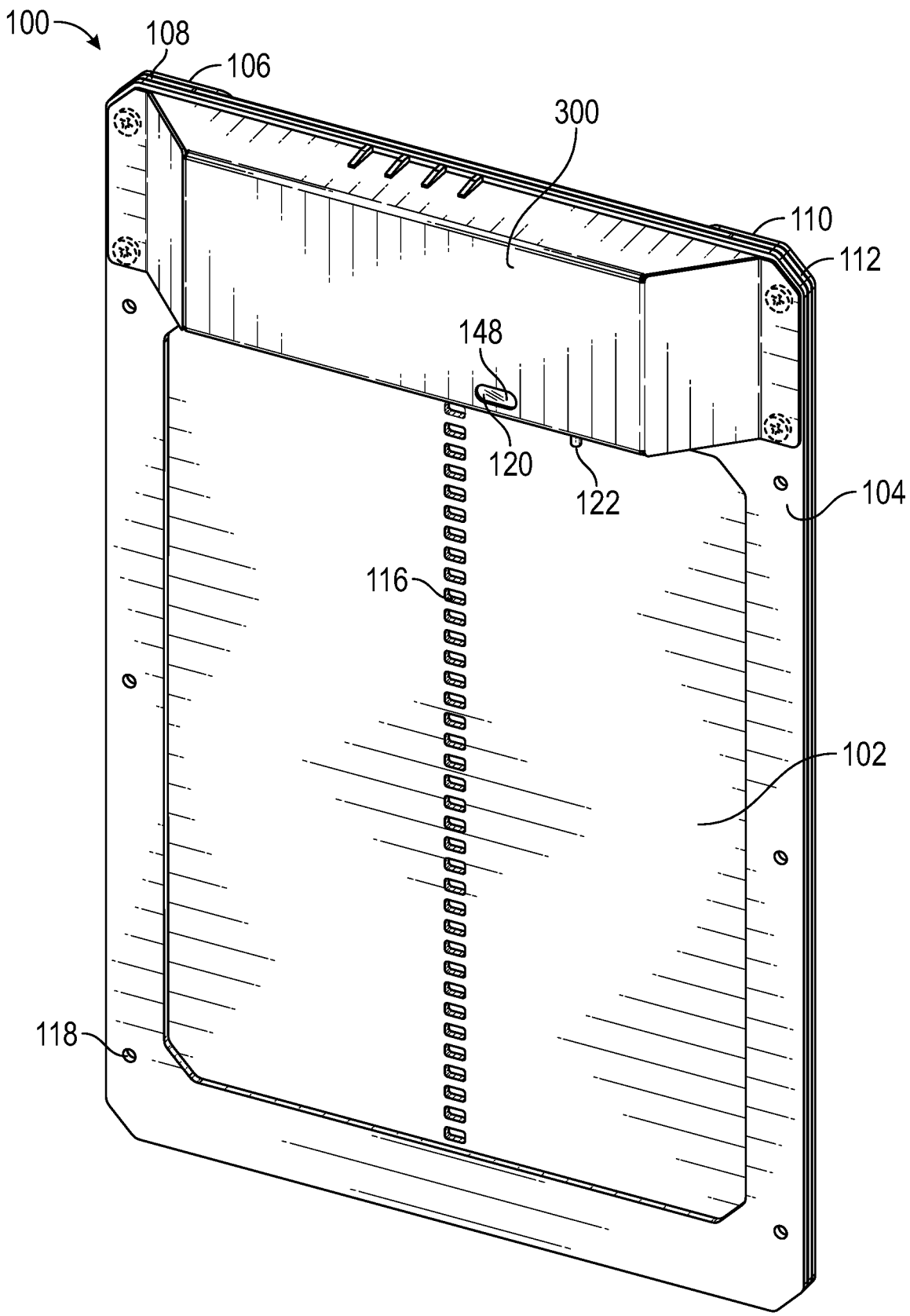
FIG. 1 is a perspective view of an embodiment of a door unit.

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

The present disclosure relates to an automatic animal door, specifically an automated light-sensitive configurable animal door.

The invention of the present disclosure may be an animal door unit having an assembly comprising a battery powered automatic door (for example, configurable as a chicken coop door). The door may open and close via an opening mechanism (for example, a motor and sprocket). Specifically, the door may rise and lower vertically. However, in an alternate embodiment, the door may be disposed horizontally, such that the door also moves horizontally. In yet a further embodiment, the door unit may be disposed vertically in conjunction with a horizontally mobile door. Thus, in such an embodiment, the opening mechanism may be disposed on the left or right portions of the door unit. The door unit may comprise a plurality of holes sized to accept the sprocket and enable the motor to move the door. In such an embodiment, the holes may be positioned in a straight line, such that the motor may draw the door in the same direction as the holes. Accordingly, the door may be positioned between two side guides and the door frame, such that the door emerges from the side guides, yet is held securely by the guides when retracted.

The door motion assembly may comprise a motor and a sprocket and may be powered by a battery. In an embodiment, the door motion assembly is contained within the closed module, for example, disposed on the top potion of the door. The door motion assembly may be configured to open and close the door at safe speeds to prevent harm to the captive animals. Further, the door's motion may be a function of the ambient light and, therefore, may be based on the signals generated by a light sensor. However, the door may also be operated by a set schedule or, manually, via activation of an on-board button.

In an embodiment, the animal door unit may be easy to install (for example, the average user may install the device in under ten minutes). Accordingly, the animal door may not include any overly complicated wiring or cables. In one embodiment, the battery may have an extended battery life (for example, a minimum of one year battery life). Further, the animal door may include a programmable pushbutton. In an embodiment, the door and guides may be composed of aluminum. The door or other components may be powder-coated for added protection and to provide the end-user with their color of choice.

Figure 2A:
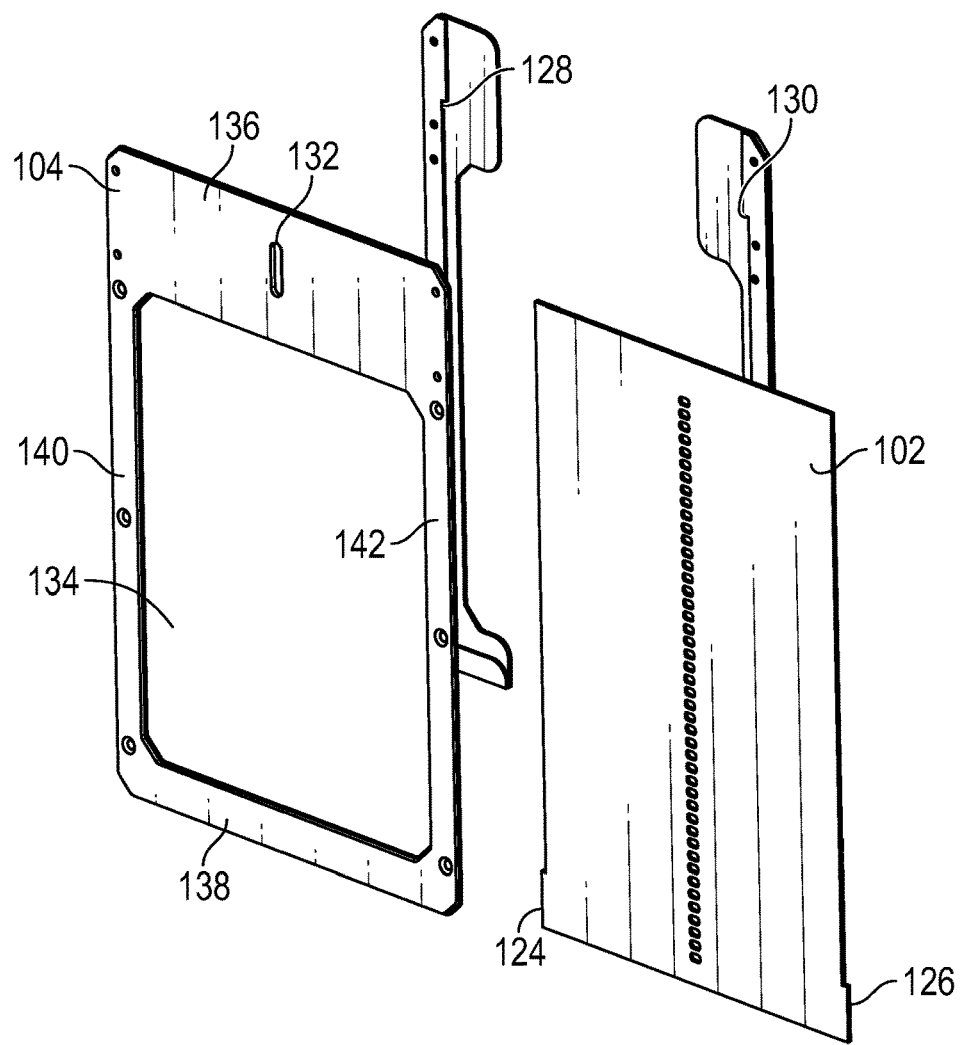
FIGS. 2A-2B are exploded views of an embodiment of the door unit structural components.
Figure 2B:
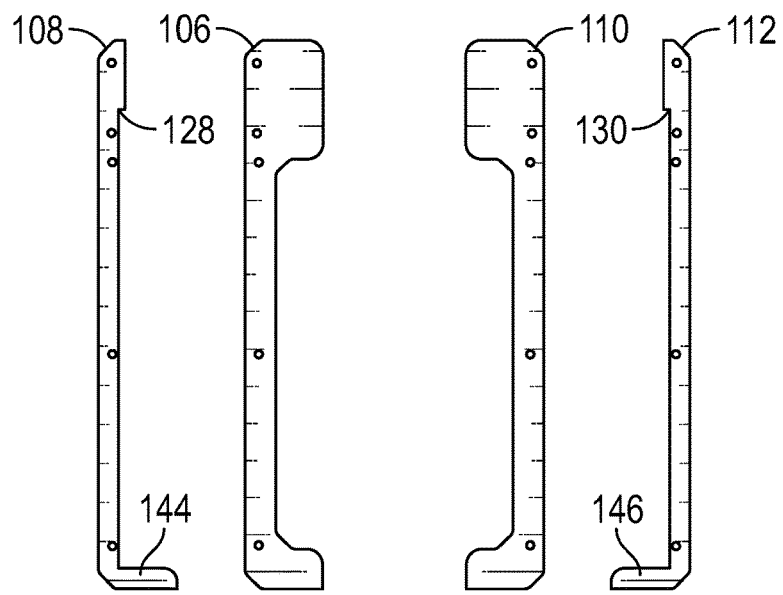

Referring to FIGS. 1, 2A, and 2B, the invention of the present disclosure may be a door unit 100. The door unit 100 may include a door plate 102, a front panel 104, a left rear panel 106, a left guide 108, a right rear panel 110, and a right guide 112. The door plate 102 may be a generally rectangular, thin member configured to traverse entrance 134. The door unit 100 and the door plate 102 may have at least two states: an open state; and a retracted state. In an open state, the door plate 102 may not obstruct the entrance 134 or may obstruct only a negligible area of the entrance 134. In a retracted state, the door plate 102 may completely obstruct the entrance 134. For example, in an open state, chickens may freely travel between the chicken run and the chicken coop; and in a retracted state, chickens may be prevented from traveling between the two areas.

The front panel 104 may include a top portion 136, a bottom portion 138, a left post 140, and a right post 142. In such an embodiment, the entrance 134 may be a void bound by the top portion 136, the bottom portion 138, the left post 140, and the right post 142. The top portion 136 may have a greater surface area than bottom portion 138. For example, the top portion 136 may be sized to at least accept the module case 300. The corners of the entrance 134 and the corners of the front panel 104 may be rounded, flat, or otherwise shaped such that the corners are not sharp. For example, as shown in FIG. 1, the corners of the entrance 134 and the front panel 104 may be generally flat and slanted at roughly 45 degrees. Such corners may impose a decreased risk of injury to the user and/or the inhabitant animals. The front panel 104, the left rear panel 106, the left guide 108, the right rear panel 110, and/or the right guide 112 may include holes configured to accept fasteners to attach the module case 300 to the front panel 104. Further, said holes and fasteners may aid in affixing the front panel 104 to the guides 108/112 and rear panels 106/110.

In an embodiment, in a retracted state, the door plate 102 may be disposed between the front panel 104, the left rear panel 106, the left guide 108, the right rear panel 110, and the right guide 112. The door plate 102 may have a thickness equal to or slightly less than the thickness of the left guide 108 and/or the right guide 112. Accordingly, the door plate 102 may sit securely between the front panel 104, the left rear panel 106 and the right rear panel 110 with sufficient tolerance to enable controlled vertical movement of the door plate 102.

The left guide 108 may be disposed between the left post 140 of the front panel 104 and the left rear panel 106. The right guide 112 may be disposed between the right post 142 of the front panel 104 and the right rear panel 110. The left guide 108 and the right guide 112 may be generally L-shaped, such that each guide 108/112 includes a left guide base 144 and a right guide base 146, respectively, protruding towards one another. The left guide base 144 and the right guide base 146 may interface with the bottom portion of the door plate 102 when in a retracted state. Thus, the left guide base 144 and the right guide base 146 may prevent the door plate 102 from falling below the bottom portion 138 of the front panel 104. Further, the left guide base 144 and the right guide base 146 may prevent the motor 330 from over-retracting the door plate 102.

Further, the left guide 108 and the right guide 112 may include a left retaining edge 128 and a right retaining edge 130, respectively. Moreover, the door plate 102 may include a left door plate wing 124 and a right door plate wing 126. The wings 124/126 may be disposed on the bottom portion of the left and right side of the door plate 102. The left door plate wing 124 may be configured to interface with the left retaining edge 128 such that the door plate 102 is captured. Similarly, the right door plate wing 126 may be configured to interface with the right retaining edge 128 such that the door plate 102 is captured. In an embodiment, the door unit 100 may include solely the left door plate wing 124 and the left retaining edge 128, solely the right door plate wing 126 and the right retaining edge 130, or both the wings 124/126 and the edges 128/130. The wings 124/126 and the edges 128/130 may have dimensions sized such that the door plate 102 does not exit the door unit 100, yet acts as a stopper where the bottom portion of the door plate 102 does not obstruct the entrance 134.

The surface area of the left rear panel 106 may be greater than the surface area of the left guide 108 and the surface area of the right rear panel 110 may be greater than the surface area of the right guide 112. In effect, the left rear panel 106 and the right rear panel 110 may partially retain the door plate 102. In an embodiment, the portions of the left rear panel 106 and the right rear panel 110 that are configured to retain the door plate 102 may be sized such that said portions are concealed by the top portion 136, the bottom portion 138, the left post 140, and the right post 142 of the front panel 104. For example, said portions of the rear panels 106/110 may not intrude into the entrance 134. In one embodiment, door unit 100 may measure 9.4 inches wide and 13.8 inches high, and the entrance 134 may measure 8 inches wide and 10 inches high. In an embodiment, the door plate 102 may also be larger, but the ratio between the sides of the outer edges of the front panel 104 and the entrance 134 may be maintained. However, the door unit 100 and the components thereof may be any suitable dimensions.

In various embodiments, the door unit 100 and the door plate 102 may have various designs. The shape of the door plate 102 may be altered such that it would be suitable for other species of animals (for example, a larger entrance 134 or a different aspect ratio of the door plate 102 height to width). Alternatively, door plate 102 and/or door unit 100 may be any suitable shape. For example, the door plate 102 and/or door unit 100 may be triangular. In an embodiment, the door unit 100 is equipped with a smaller or shallower module case 300, for example, to prevent the accumulation of snow and ice on the door unit 100. In such an embodiment, the smaller module case 300 would prevent ice buildup, which would otherwise make it difficult to operate the door unit 100.

The door plate 102 and/or the various structural components of the door unit 100 may be composed of any suitable materials, including, but not limited to, aluminum, steel, plastic, polymer, and wood. In a further embodiment, the various structural components of the door unit 100 (for example, the front panel 104 and left rear panel 106) may be composed of several segments or parts. In such an embodiment, when disassembled, the door unit 100 may be more compact.

The front panel 104, the left rear panel 106, the left guide 108, the right rear panel 110, and the right guide 112 may each include one or more mounting holes 118. The mounting holes 118 may be sized to accept a fastener, enabling the door unit 100 to be affixed to a mounting surface (for example, a chicken coop).

Figure 3:
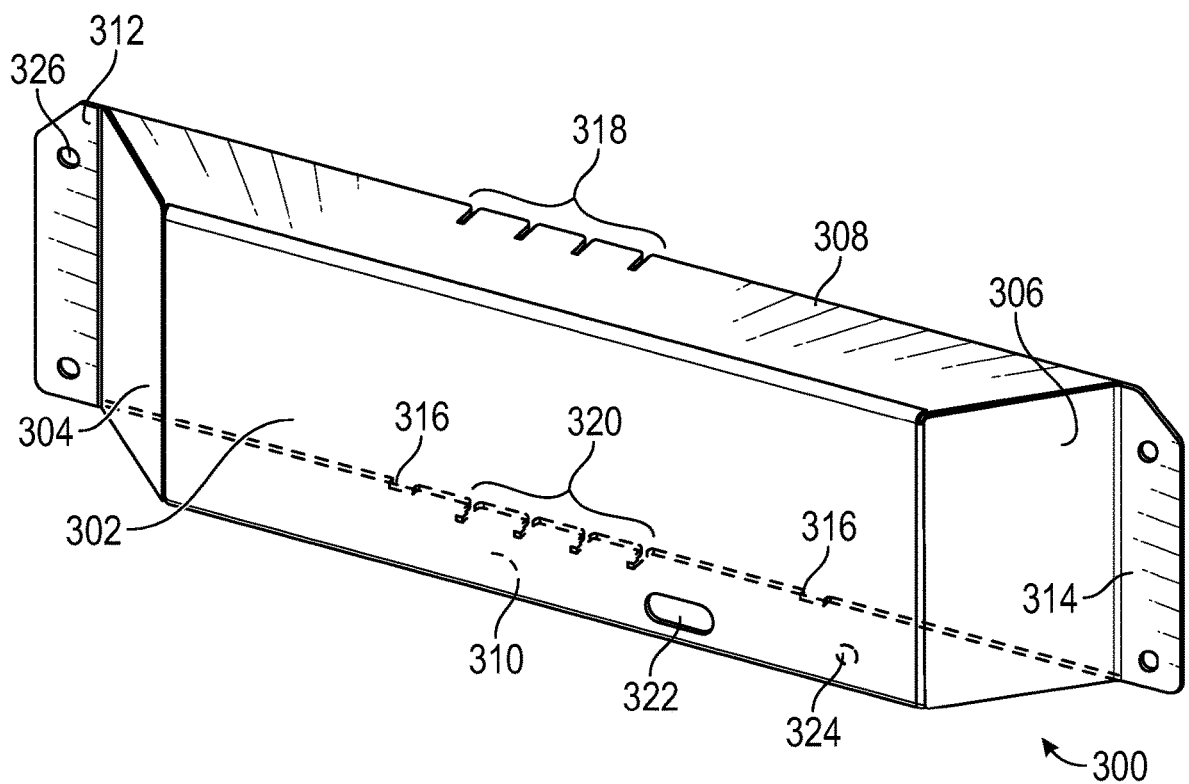
FIG. 3 is an illustration of an embodiment of a module case.

In an embodiment, a module case 300 may be affixed to the front panel 104 (for example, to the top portion 136). As shown in FIG. 3, the module case 300 may include a front face 302, a left wall 304, a right wall 306, a top wall 308, a bottom wall 310, a left extension 312, and/or a right extension 314. The left wall 304 and the right wall 306 may be angled such that an obtuse angle is formed on the inside of the module case 300 between the left wall 304 and the front face 302 and the right wall 306 and the front face 302. The front face 302 may include a light sensor window 322 sized and positioned to allow the light sensor 120 to receive light from the environment. In an embodiment, a lens or glass component is disposed within the light sensor window 322. The lens or glass component may protect the light sensor 120 from the elements and debris or may filter the incident light. In an embodiment, the lens is polycarbonate. The function of the lens may be to protect the interior of the module case 300 from external influences. Further, the lens may diffuse the light, for example, averaging the light.

The bottom wall 310 may include a pushbutton hole 324 sized and positioned to enable actuation of the pushbutton 122. The top wall 308 may include one or more top slots 318. Further, the bottom wall 310 may include one or more bottom slots 320 and/or one or more niches 316. The top slots 318 and the bottom slots 320 may be sized to accept the motor mounts 336. The motor mounts 336 may be vertical supports configured to retain at least the motor 330. The motor mounts 336 may be vertical slats composed of aluminum. However, the motor mounts 336 may be composed of any suitable material. In one embodiment, the motor mounts 336 attach, or are otherwise adhered, to the motor 330. However, alternatively, the motor mounts 336 may be include one or more gaps sized to accept the motor 330 and/or sprocket 332, such that the motor mounts 336 at least partially surround the motor 330 and/or sprocket 332. In an embodiment where the niches 316 are present, the niches 316 may be configured to promote airflow within the module case 300. Alternatively, the niches 316 may be sized to accept additional wires for tertiary or added electrical components.

In an embodiment, the left extension 312 and/or the right extension 314 may include one or more module case mounting holes 326 configured to affix the module case 300 to the front panel. The left extension 312 and the right extension 314 may include two flat, top corners, such that the module case 300 does not include sharp corners capable of harming the user or the animal inhabitants.

Figure 4:
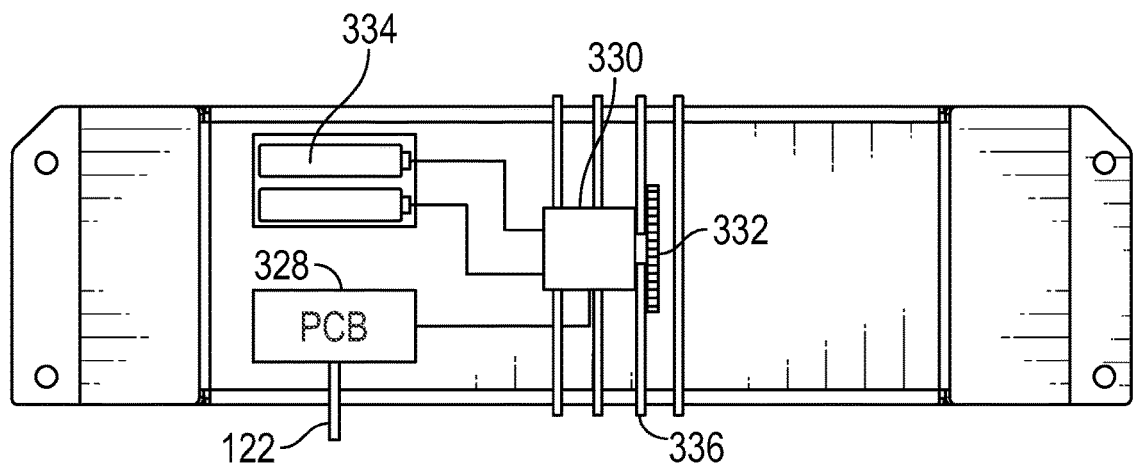
FIG. 4 is an illustration of an embodiment of the electrical components housed within a module case of a door unit.

Referring to FIG. 4, the door unit 100 may further comprise a printed circuit board (PCB) 328, a motor 330, a sprocket 332, and/or a battery 334. The PCB 328, the motor 330, and the battery 334 may be fully concealed within the module case 300 when the module case 300 is mounted to the front panel 104. The motor may be a servo motor and may include a 3-volt DC power supply. However, any suitable motor and/or power supply may be used. The sprocket 332 and/or the pushbutton 122 may be disposed partially within the module case 300. For example, the sprocket 332 may partially extend through the sprocket window 132 and the pushbutton 122 may partially extend through the pushbutton hole 324.

The battery 334 may be in communication with at least the motor 330 and the PCB 328. In an embodiment, the battery 334 is any commonly available battery format, for example, AA. The door unit 100 may comprise multiple batteries 334. In a preferred embodiment, the door unit 100 utilizes two AA batteries.

In an embodiment, the sprocket 332 moves the door plate 102 over a band of rectangular guide holes 116 that run vertically along the center of the door plate 102. In such an embodiment, a sprocket tooth enters one of the rectangular guide holes 116, the sprocket 332, driven by the motor 330, rotates, consequently causing the door plate 102 to move (for example, either to open the door plate 102 or retract the door plate 102). Thus, the rotational motion of the sprocket 332 may be translated to linear motion in the door plate 102. By opening and closing the door plate 102 via a motor 330 and sprocket 332, the door unit 100 is more robust and less prone to wear and tear. For example, if utilizing a pulley or rope system instead of a motor 330 and sprocket 332, the rope may fray or become loose. Further, the torque of the motor 330 also may more easily overcome obstacles such as obstructive pebbles or ice on the guides. The motor 330 and sprocket 332 direct drive of the door plate 102 is an improvement over a rope mechanism because in a rope mechanism gravitational force is the sole force that closes the door and, thus, may not be strong enough to overcome obstacles.

The motion of the door plate 102 may be automated by opening and closing the door plate 102 automatically, based on ambient light intensity, a factory configuration, and/or or previous manual or previous light configuration. The ambient light (for example, the light produced by the sun or the light otherwise projecting on the door unit 100) intensity may be detected by the light sensor 120. Further, the light sensor 120 may enable the light configuration of the door to be carried out. The light sensor 120 may be a silicon based optical sensor. However, any suitable optical sensor may be utilized. In an embodiment, the light configuration is performed with the aid of a smartphone, personal computer, or other light generating electronic device. The light configuration is described in further detail below.

The door unit 100 may also include an indicator light 148. Such an indicator light 148 may be disposed within the light sensor window 322 (for example, the light sensor 120 and the indicator light 148 may be disposed within the light sensor window 322) and may be configured to emit various light signs during configuration. Thus, the indicator light 148 may communicate the state of the door unit 100 via different colors and various cadences of flashing light. Such communications via the indicator light 148 may be notifications to the user. For example, the indicator light 148 may include a flashing pattern or color that communicates that the door plate 102 will close within 20 minutes. The indicator light 148 may be in electrical communication with at least the PCB 328 and the battery 334. In a further embodiment, the door unit 100 includes a speaker in electrical communication with at least the PCB 328. The speaker may be configured to emit alert noises or sounds that otherwise communicate to the user. In an embodiment, the speaker may be integral to the motor 330 itself. For example, the PCB 328 may cause the motor 330 to generate a resonant frequency. However, in another embodiment, a separate speaker component may be disposed within the module case 300, wherein the separate speaker is in electrical communication with at least the PCB 328.

The pushbutton 122 may be actuated to manually configure the door motion. The pushbutton 122 may also be used to manually open or close the door plate 102. When opening and closing the door plate 102, the motion mechanisms (for example, PCB 328 and motor 330) may prevent harm or damage to both the door user and the animals for which the door unit 100 is intended. Accordingly, the door unit 100 may include various safety mechanisms, such as a time delay and an obstruction-sensitive brake configured to stop, and/or reverse, the retraction of the door plate 102 in case there is an animal within the entrance 134. Further, the door unit 100 may institute a brake if the door plate 102 interferes with an obstruction as the door plate 102 is rising from the top portion of the door unit 100. In one embodiment, the door plate 102 may only open or retract a predetermined time (for example, twenty minutes) before or after sunrise or sunset. This may prevent "false" opening or closing if the light sensor 120 detects artificial light or sudden flashing or dimming.

In an alternate embodiment, the indicator light 148 is replaced with or supplemented by a display (for example, an LCD display), where various information is presented to the user (for example, the selected configuration mode, battery status, etc.). In such an embodiment, said information may be displayed when the pushbutton 122 is actuated. The door unit 100 may give the user feedback via the indicator light 148 (for example, changing color or flashing). Thus, a door unit 100 comprising an indicator light 148 instead of a display screen may consume significantly less energy, increasing the longevity of the battery life.

In an embodiment, the door unit 100 may include various modes or settings. The PCB 328 may implement one or more aspects of the door unit 100, system and method for automating motion of the door plate 102 (the "Engine") according to one embodiment of the invention. Instances of the PCB 328 may include a processor/CPU, memory, a power supply, and input/output (I/O) components/devices, e.g., microphones, speakers, displays, touchscreens, keyboards, mice, keypads, microscopes, GPS components, cameras, light sensors, accelerometers, targeted biometric sensors, etc., which may be operable, for example, to alter the door mobility schedule. The processor can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software-controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software. The memory, which can include Random Access Memory (RAM) and Read Only Memory (ROM), can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system, data storage, which may include one or more databases, and programs and/or applications, which can include, for example, software aspects of the program. The ROM can also include Basic Input/Output System (BIOS) of the electronic device. Software aspects of the program are intended to broadly include or represent all programming, applications, algorithms, models, software and other tools necessary to implement or facilitate methods and systems according to embodiments of the invention. The elements may exist on a single computer or be distributed among multiple computers, servers, devices or entities. Accordingly, the PCB 328 and its components as described above, may store and execute the program aspects of the door unit 100 motion and the various "modes" and safety features described herein.

In a default mode, the door plate 102 may open twenty minutes after sunrise and close twenty minutes after sunset, wherein the times of sunrise and sunset are determined via the light sensor 120. Accordingly, the light sensor 120 may detect when the ambient light has surpassed a predetermined light intensity threshold. For example, the PCB 328 may contain program instructions that, when executed, determine whether the light detected by the light sensor 120 is indicative of sunrise and/or sunset. In such an embodiment, the PCB 328 (for example, the memory) contains predetermined light thresholds for both sunrise and sunset. Thus, the PCB 328 receives a signal from the light sensor 120 containing information about the ambient light and compares said information to the stored sunrise and sunset light thresholds. If the PCB 328 determines that the sunrise or sunset light thresholds have been surpassed, the PCB 328 marks said time as sunrise or sunset, and informs the motor 330 to open or retract the door plate 102 within the predetermined temporal duration (for example, twenty minutes). However, the default mode may induce the door plate 102 to open and close any fixed duration after sunrise or sunset, for example, ten minutes, twenty minutes, or twenty-five minutes.

The door unit 100 may include a morning opening time mode. In such an embodiment, the user may manually set the time at which the door plate 102 opens. The PCB 328 may be configured to receive the signals as described herein and appropriately modify the opening time of the door plate 102. The user may press the pushbutton 122 and apply pressure on the pushbutton 122 until the indicator light 148 becomes green. Then, the user may release the pushbutton 122 and press the pushbutton 122 once again. In an embodiment, after such a procedure is performed, the door plate 102 will open automatically every morning at the same time. For example, if the user conducts the aforementioned procedure at 7:30 AM, then the door plate 102 will open at 7:30 AM every morning. For the purposes of this disclosure, any combination of pushbutton 122 inputs may be programmed to induce the morning opening time mode.

The door unit 100 may also include an evening delay time mode configured to extend the closing time a duration after sunset. For example, the closing time may be delayed 20-40 minutes after sunset. To initiate such a mode, the user may hold the pushbutton 122 until the indicator light 148 glows red. Next, the user may release and press the pushbutton 122 again to confirm the evening delay setting. Such a function may be utilized when the door unit 100 is placed in a dark environment that causes the door to close before nightfall, is mounted indoors, or is used in conjunction with a specific breed of chicken that requires extended time in the run. For the purposes of this disclosure, any combination of pushbutton 122 inputs may be programmed to induce the evening delay time mode. In the evening delay time mode, the door plate 102 may close at the time when the evening delay time mode command was delivered. In such an embodiment, the door unit 100 may initiate closing at said time each night. However, in another embodiment, entry of the evening delay time mode may increase the default retraction duration of twenty minutes after sunset to forty minutes after sunset (or any other reasonable delay).

The door unit 100 may include an early evening time mode. In such a mode, the door plate 102 closing time may be modified to five minutes after sunset. However, in early evening time mode, the closing time may be changed to any suitable period of time after sunset. To initiate early evening time mode, the user may hold the pushbutton 122 until the indicator light 148 turns red. The user may then release the pushbutton 122 and press the pushbutton 122 again for a confirmatory duration (for example, three seconds) to confirm the mode. For the purposes of this disclosure, any combination of pushbutton 122 inputs may be programmed to induce the early evening time mode.

The door unit 100, for example the PCB 328 and light sensor 120, may be configured to recognize a shift in day and night and vice versa. At such a shift, the light sensor 120 may send a signal to the PCB 328, where the PCB 328 further instructs the indicator light 148 to present as blue. Such a mechanism may be a safety feature that indicates that the door plate 102 will only open in the presence of natural light. Thus, this function may prevent the door from falsely closing or opening, for example, due to artificial light, such as flashlights, streetlights, etc. However, when the door unit 100 is in this mode, the user may press the pushbutton 122 to close the door plate 102 manually. In such an instance, if the user opts to close the door plate 102 via the pushbutton 122, the door unit 100 programming will return to the settings of the previous day. In effect, the blue indicator light 148 may be an indication that the opening and/or retraction of the door plate 102 is imminent. The indicator light 148 may turn blue upon the PCB 328 determination that the sun has set or risen.

In an embodiment, the door unit 100 includes an obstruction safety feature, where the door plate 102 will stop for a period of time if the entrance 134 is obstructed. In a further embodiment, the door plate 102 continues or reinstates its motion after the period of time (for example, an obstruction clearance period) has lapsed. When opening and closing the door plate 102 during typical operation (for example, while running in default mode or a user-customized mode), the PCB 328 may inform the motor 330 to drive the sprocket 332 in the direction necessary to open or close the door. In such an example, the motor 330 may continue to run until the motor 330 experiences resistance, such as when the door plate 102 reaches the bottom of the entrance 134 or when the wings 124/126 interface with the retaining edges 128/130. However, in an alternate embodiment, the initial command from the PCB 328 to the motor 330 may instruct the motor 330 to drive the door plate 102 the vertical distance of the entrance 134. As a non-limiting example, if the entrance 134 has a height of 9 inches, the motor 330 may be instructed to drive the sprocket a set number of rotations to move the door plate 102 9 inches.

The door unit 100 may include an insufficient power mode. In the insufficient power mode, the door unit may display a blinking red light on the indicator light 148 if the battery 334 is drained. Further, when battery 334 is dead, the door plate 102 may close and may remain closed until the batteries 334 are replaced or otherwise charged. For the purposes of this disclosure "sufficient charge" may be defined as the charge stored within the battery 334 wherein the battery 334 is able to power the door unit 100 to perform the functions described herein. Similarly, "insufficient charge" may be defined as a battery state wherein the door unit 100 is unable to properly open and retract the door plate 102 or is unable to process, via the PCB 328, light signals from the light sensor 120. The PCB 328 may be configured to monitor the charge of the battery 334 and may include thresholds for determining whether the battery 334 charge has depleted below said thresholds. Consequently, the PCB

328 may enter the insufficient power mode upon battery 334 depletion below such a threshold.

A default factory reset may be initiated by holding the pushbutton 122 for a predetermined duration (for example, twenty seconds). However, removal and insertion of new batteries 334 may also set the door unit 100 to a default factory mode. Upon default reset, the door unit 100 may emit a sound, for example, the same sound emitted upon first activation.

The door unit 100 may be waterproof, such that the electrical components (PCB 328, batteries 334, etc.) are safe from all weather conditions. Accordingly, the door unit 100, specifically the motor 330, may work in harsh environments, heavy rain, and snow. The module case 300 may be closely affixed to the front panel 104, such that moisture or water cannot enter the module case 300. In a further embodiment, a gasket or rubber retainer is disposed between the module case 300 and the front panel 104.

The door unit 100 may be configured via an external configurator. The external configurator may be executed on a smart device, mobile phone, computer, or another electronic device. The external configurator may be suitable for those users seeking to personalize or customize their door unit 100. In an embodiment, the external configurator may be a program or software element that instructs the smart device to generate and display various images. The external configurator may be configured to generate signals based on a visual light communication system. In such a visual light communication system, the images may be comprised of black and white light generated by a 2-bit program. Accordingly, the white and black light may be configured such that the light sends a bitstream that the PCB 328 may recognize and convert to the desired settings. In such an embodiment, the external configurator may function at maximum effectiveness when the brightness of the smart device is set to maximum and when the battery-saver mode is deactivated. In one embodiment, the external configurator may be retrieved from a URL or a commonly accessible "app store." The external configurator, when accessed on the smart device, may prompt the user to select various settings. The various settings may include, but are not limited to: the door opening trigger time, the door closing trigger time, and other additional relevant features.

The external configurator may include, but is not limited to, the following features and settings: Opening Trigger (Sunrise—Open after sunrise, Clock—Set the time of opening the door, Do not open—Press the test button manually each time the user wishes the door to open); Closing Trigger (Sunset—Close after sunset, Clock—Set the time of closing the door, Do not close—Press the test button manually each time the user wishes the door to close); Additional features (Extra safety—Set to pause while closing for 20 seconds, Winter mode—Set to burst with full power for 3 seconds); and GPS mode (determining, based on geolocation of the smart device or door unit 100, sunrise and sunset times and opting for this GPS mode to override the light sensor-specific modes). After setting available and desired features, the following actions may be required: send data to the door unit 100 using a smart device screen; set the device's screen brightness to maximum; press the pushbutton 122 for 8 seconds (for example, a blue indicator light 148 may confirm that the door unit 100 is ready to receive instructions); and click the START programming button on the user's device and cover the door's light sensor 120 with the screen of the user's smart device.

To initiate the custom configuration via the external configurator, the pushbutton 122 may be depressed until the indicator light 148 turns blue. In such an embodiment, once the indicator light 148 has turned blue, the pushbutton 122 may be released and pressed once again to confirm that the door unit 100 is prepared to receive instructions from the external configurator. Upon entering this 'ready' mode, the door unit 100 may emit a confirmation sound. The light sensor 120 may now receive the images from the smart device. To initiate the external configurator on the smart device, the user may start the program via the smart device. Accordingly, the smart device's display may begin presenting various images and flashing lights. When the smart device's screen is held in proximity to the light sensor 120, the PCB 328 may read the signals as the light sensor 120 detects them. Thus, the PCB 328 may program the door unit 100 according to the instructions encoded within the external configurator's images. If the PCB 328 successfully interpreted the external configurator's signal, the door unit 100 may emit a confirmatory notice, such as a green indicator light 148 and/or a high pitch noise. If the configuration is unsuccessful, the door unit 100 may present a red indicator light 148 and/or a low pitch noise.

In a further embodiment, the door unit 100 may include a sensor configured to detect how many animals (for example, chickens) traverse the entrance 134 per a period of time. Such a sensor may be linked to an application that the user may install on an electronic device (for example, smartphone, computer, etc.). Thus, the user, regardless of their location, may monitor what is happening in the chicken coop and the occupancy of the chicken coop and chicken run at any desired time. Therefore, the door unit 100, for example, the PCB 328 may be internet-connected or otherwise be configured to wirelessly communicate with the smart device or an overarching network. The aforementioned sensor may be a motion sensor or other sensor configured to detect the movement of animals through the entrance 134. Such a sensor may be disposed on the bottom wall of the module case 300.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. An animal door unit comprising:
 a front panel, a left rear panel, a left guide, a right rear panel, and a right guide,
   wherein the front panel comprises an entrance,
   wherein the left guide is disposed between the front panel and the left rear panel, and
   wherein the right guide is disposed between the front panel and the right rear panel;
 a door plate having a plurality of guide holes, the door plate configurable in a retracted state and an open state,
   wherein the door plate is disposed between the front panel, the left rear panel, the left guide, the right rear panel, and the right guide,
   wherein, in the retracted state, the door plate traverses the entrance, and
   wherein, in the open state, the door plate does not traverse the entrance;
 a module case disposed on the front panel;
 a motor disposed within the module case; and
 a sprocket in rotational communication with the motor,
   wherein the sprocket interfaces with the plurality of guide holes, such rotational movement of the sprocket inducing linear movement in the door plate.

2. The animal door unit of claim 1, further comprising:
a light sensor configured to at least detect ambient light;
a Printed Circuit Board ("PCB") in electrical communication with at least the light sensor and the motor, the PCB configured to instruct actuation of the motor; and
a battery in electrical communication with at least the PCB.

3. The animal door unit of claim 2, further comprising:
an indicator light in electrical communication with the PCB, the indicator light configured to communicate a notification to a user.

4. The animal door unit of claim 3, wherein the PCB comprises computer-executable instructions for one or more modes, wherein each of the one or more modes are configured to control movement of the door plate.

5. The animal door unit of claim 4, the one or more modes comprising a default mode,
wherein, in the default mode, the PCB instructs the motor to drive the sprocket a predetermined period of time after a sunrise time and a sunset time, and
wherein the sunrise time and the sunset time are determined via the light sensor.

6. The animal door unit of claim 5, the one or more modes comprising a configurable mode,
wherein the light sensor is configured to retrieve an image via an external configurator,
wherein the external configurator is executed on a user device, and
wherein the image is encoded with a customized instruction executable by the PCB.

7. The animal door unit of claim 6, further comprising a pushbutton in electrical communication with the PCB.

8. The animal door unit of claim 7, the module case comprising a sensor window and a pushbutton hole,
wherein the sensor window is disposed in front of the light sensor, and wherein the pushbutton hole is sized to accept the pushbutton.

9. The animal door unit of claim 8, the module case further comprising a lens disposed within the sensor window.

10. The animal door unit of claim 5, the computer-executable instructions further comprising a safety feature,
wherein the PCB is configured to discontinues
the motor actuation upon contact between the door plate and an obstruction.

11. The animal door unit of claim 10, wherein the PCB is configured to reinstates the motor actuation after an obstruction clearance period has lapsed.

12. The animal door unit of claim 5, the one or more modes comprising an insufficient power mode,
wherein the insufficient power mode is actuated upon depletion of the battery,
wherein, in the insufficient power mode and when the door plate is in the open state, the PCB is configured to instructs the motor to drive the sprocket to retract the door plate, and
wherein, in the insufficient power mode, the PCB is configured to maintain the door plate in the retracted state until the battery has sufficient charge.

13. The animal door unit of claim 1, the front panel comprising a plurality of mounting holes.

14. The animal door unit of claim 1, wherein the front panel and the entrance each include flat corners.

15. The animal door unit of claim 1, the module case further comprising a plurality of top slots, a plurality of bottom slots, and a plurality of motor mounts,
wherein the motor mounts are slats configured to retain at least the motor, and
wherein the plurality of top slots and the plurality of bottom slots accept the plurality of motor mounts.

* * * * *